(12) United States Patent
Kuo

(10) Patent No.: US 8,404,325 B2
(45) Date of Patent: Mar. 26, 2013

(54) SOFT MAT

(76) Inventor: Chun-Fu Kuo, Taichung Hsien (TW)

( * ) Notice: Subject to any disclaimer, the term of this patent is extended or adjusted under 35 U.S.C. 154(b) by 234 days.

(21) Appl. No.: 13/005,316

(22) Filed: Jan. 12, 2011

(65) Prior Publication Data

US 2012/0177867 A1    Jul. 12, 2012

(51) Int. Cl.
*B32B 3/06* (2006.01)

(52) U.S. Cl. ............................... 428/71; 15/215

(58) Field of Classification Search .............. 428/71; 15/215

See application file for complete search history.

(56) References Cited

U.S. PATENT DOCUMENTS 4,822,669 A    4/1989    Roga

*Primary Examiner* — Alexander Thomas

(74) *Attorney, Agent, or Firm* — Muncy, Geissler, Olds & Lowe, PLLC

(57) ABSTRACT

A soft mat of the present invention includes a soft and non-water-absorbent base cushion, a soft and water-absorbent cover cushion and two sheaths. The sheaths are firmly disposed on the cover cushion respectively. Each of the sheaths and the cover cushion defines a pouch. Each of the pouches has an opening. One of the openings is opposite to the other one. Two sides of the base cushion are detachably inserted into the pouches, so that the base cushion is clad beneath the cover cushion. As such, the soft mat of the present invention is soft and supportive. Further, the cover cushion is able to be detached from the base cushion so as to be cleaned or washed easily.

10 Claims, 7 Drawing Sheets

SOFT MAT

BACKGROUND OF THE INVENTION

1. Field of the Invention

The present invention relates to a soft mat, which is able to be produced for a suitable size so as to be used as floor mat, mattress, seat pad or other similar mat.

2. Description of the Prior Art

Conventional soft mat is made of plural layers by sewing or fusing so as to provide multiple functions, such as water-absorbing or dust-proofing, and to provide a comfortable feel for touch. For example, a floor mat may include an upper layer, a film and a bottom layer as shown in U.S. Pat. No. 4,822,669. The upper layer is absorbent, and the film is non-absorbent. As such, the upper layer and the water or the dust soaked by the upper layer is separated from the floor by the film. The floor may not be stained by water and dust.

However, the floor mat is not easy to be cleaned. The film is firmly disposed in the floor mat. When cleaning the floor mat, user should wash both sides of the floor mat respectively. Furthermore, the film is also non-aeratable. Water may be kept between the upper layer and the film. As a result, the floor mat can hardly be dried.

The present invention is, therefore, arisen to obviate or at least mitigate the above mentioned disadvantages.

SUMMARY OF THE INVENTION

The main object of the present invention is to provide a soft mat which can be washed and cleaned easily.

To achieve the above and other objects, a soft mat of the present invention includes a soft base cushion and a soft cover cushion.

The base cushion is non-water-absorbent. The base cushion is made of non-aeratable foam material.

The cover cushion is water-absorbent. The cover cushion has a first surface and a second surface corresponding to the first surface. The cover cushion includes a mantle layer and a resin layer. The mantle layer defines the first surface thereabove. The resin layer is disposed beneath the mantle layer. The resin layer is made of aeratable material. The mantle layer and the resin layer are hydrophilic.

The sheaths are firmly disposed on the second surface of the cover cushion respectively. The cover cushion and each of the sheaths define a pouch therebetween. Each of the pouches has an opening. A direction defined by one of the openings is opposite to a direction defined by the other one of the openings.

Two sides of the base cushion are inserted and received in the pouches respectively, so that the base cushion is detachably positioned between the sheaths and the cover cushion.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
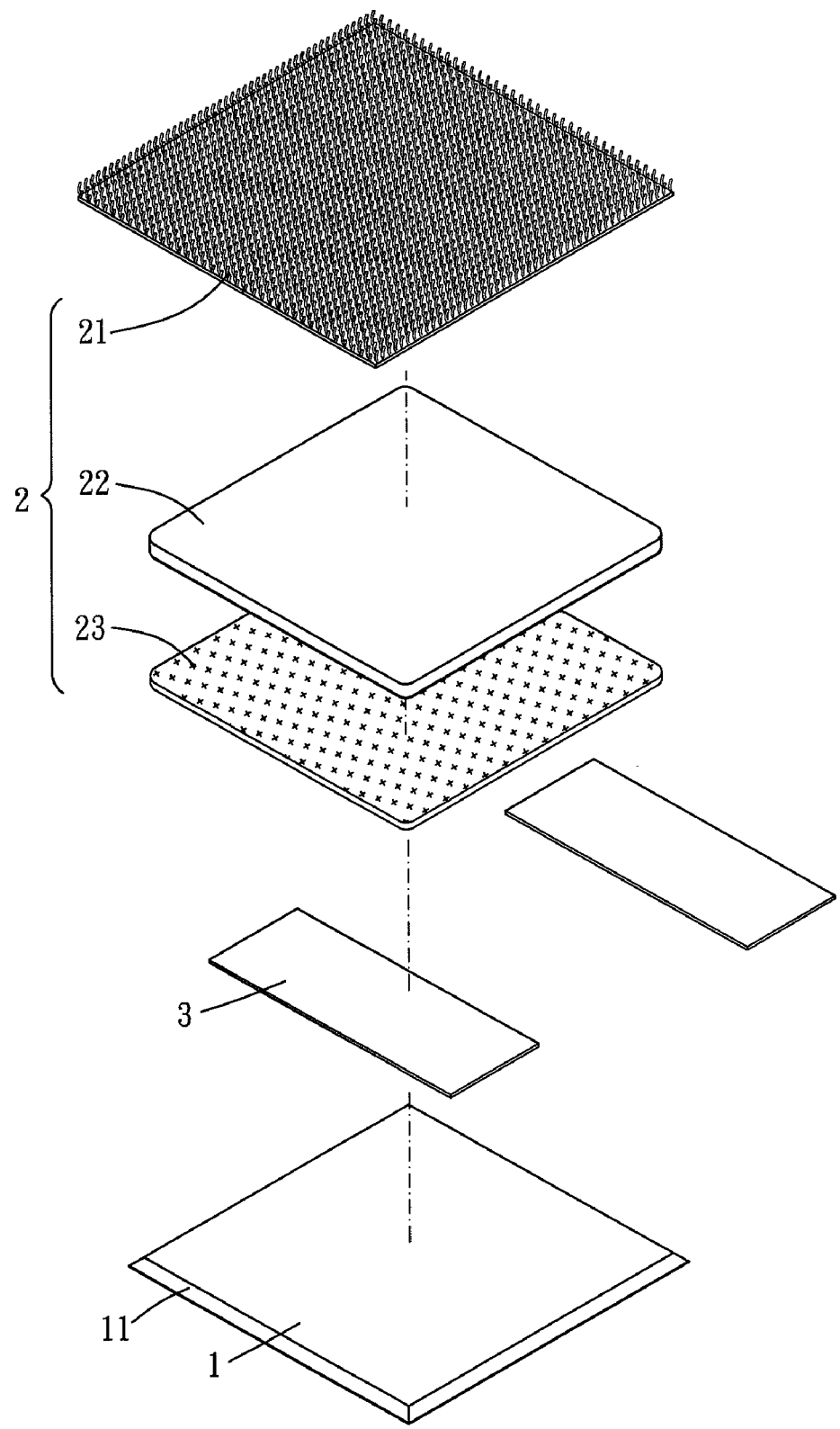
FIG. 1 is a breakdown drawing showing a first embodiment of the present invention.
Figure 2:
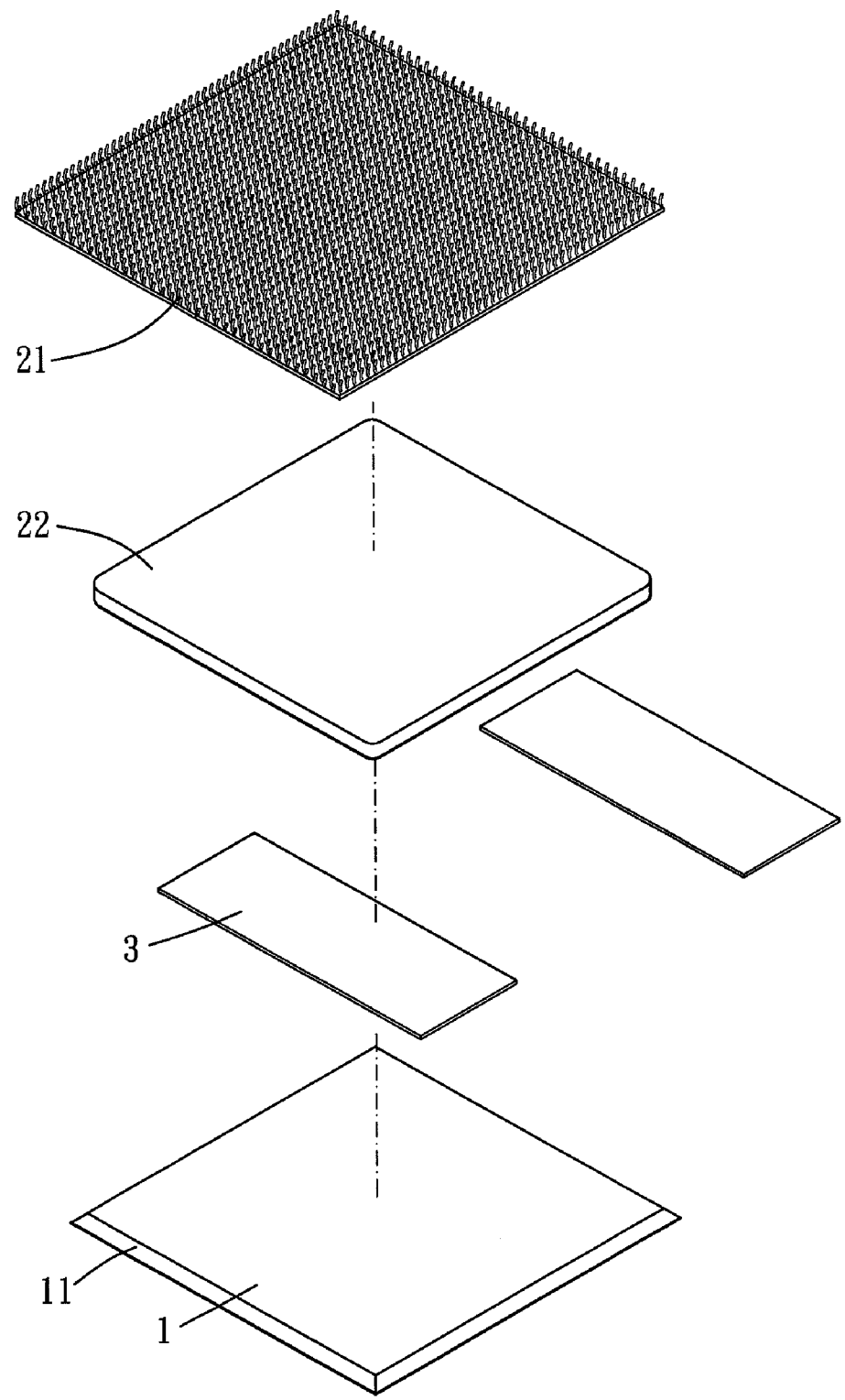
FIG. 2 is a breakdown drawing showing a second embodiment of the present invention.
Figure 3:
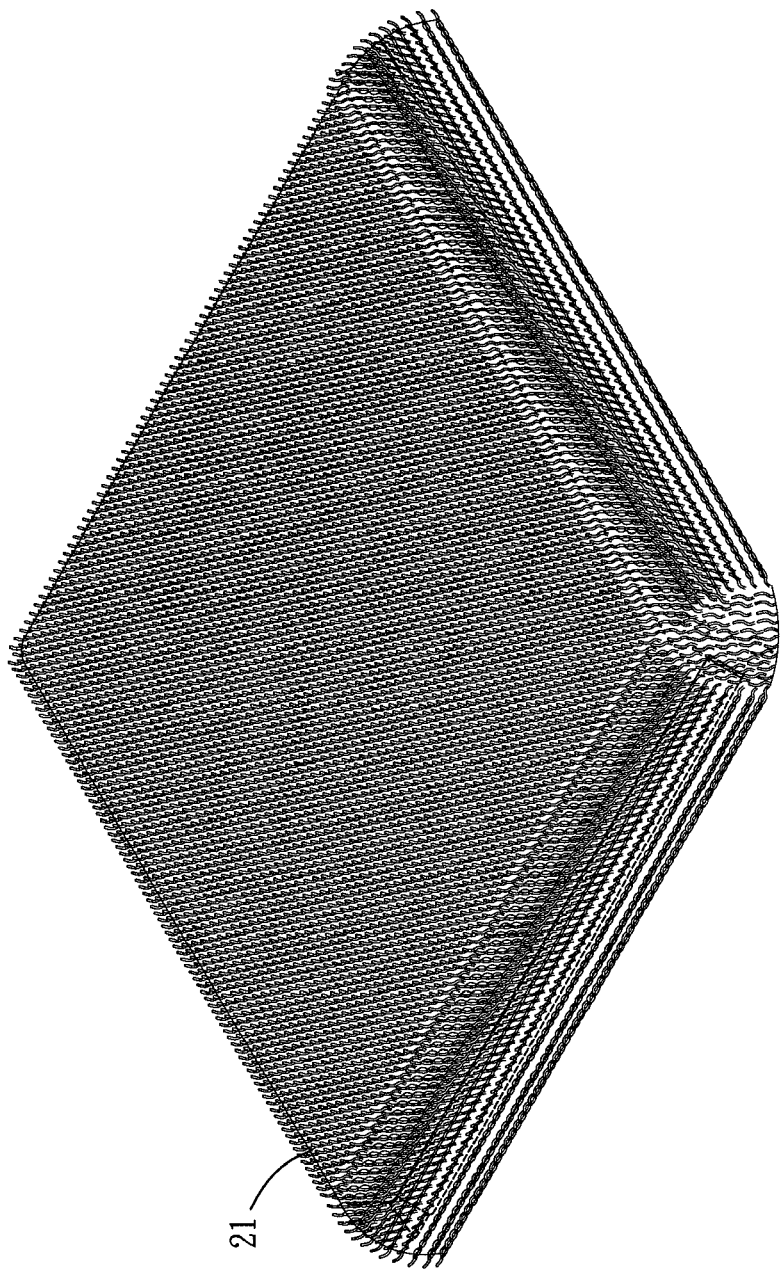
FIG. 3 is a stereogram showing a first embodiment of the present invention.
Figure 4:
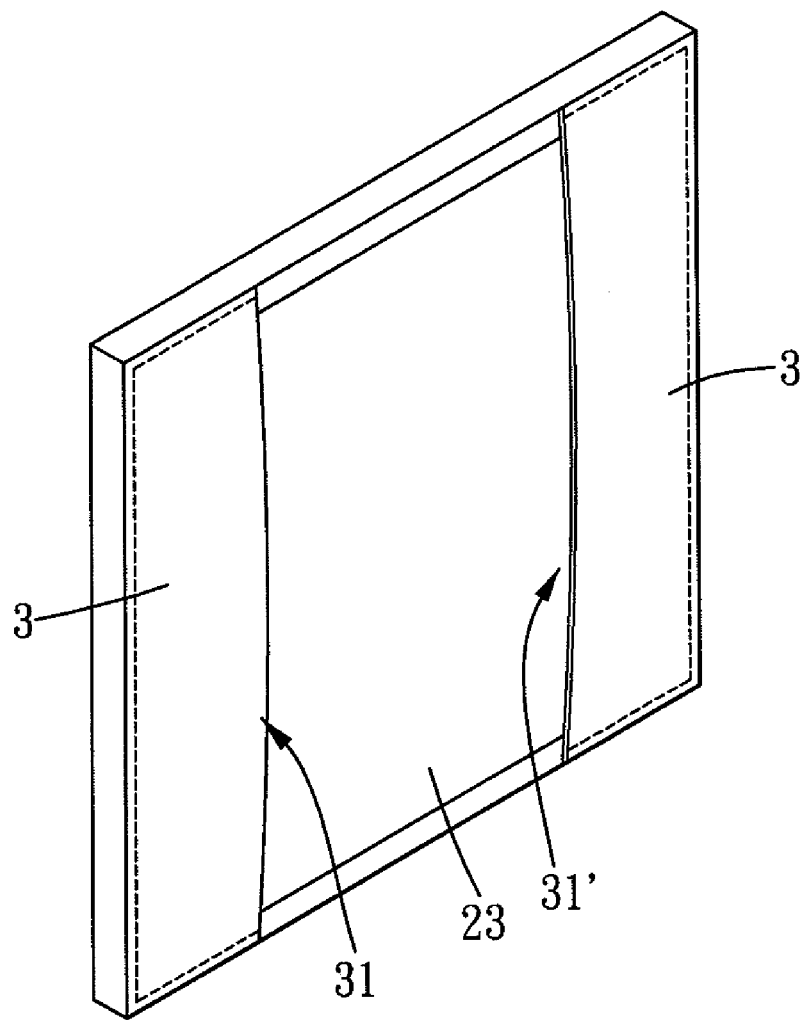
FIG. 4 is a stereogram showing a cover cushion of the present invention.
Figure 5:
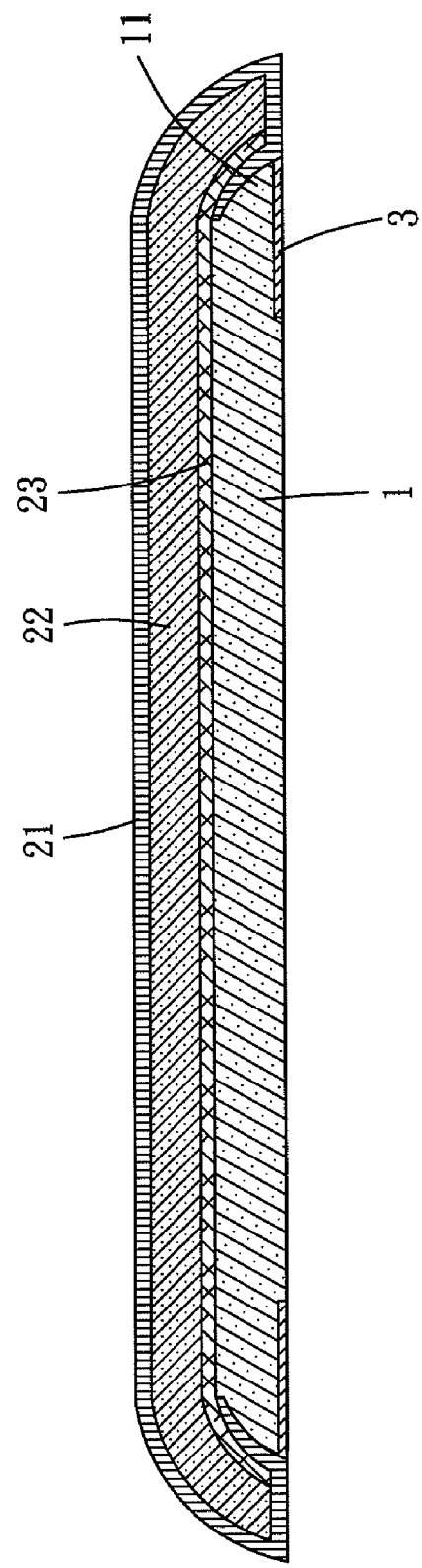
FIG. 5 is a profile showing a first embodiment of the present invention.

Please refer to FIG. 1 to FIG. 5. The soft mat of the present embodiment includes a soft base cushion 1, a soft cover cushion 2 and two sheathes 3.

The base cushion 1 is made of non-aeratable foam material. Therefore, the base cushion 1 is soft and non-water-absorbent. More particularly, non-aeratable foam material is a material which is foamed. Further, the material has a surrounding isolated surface structure. For instance, the material may totally be closed cell foam material, or the material may be opened cell foam material in its interior portion only. Preferably, two sides or the periphery portion of the base cushion 1 is formed with an insertion area 11. A thickness of the insertion area 11 is decreased to a periphery of the base cushion 1.

The cover cushion 2 is soft and water absorbent. The cover cushion 2 has a first surface and a second surface corresponding to the first surface. The cover cushion 2 includes a mantle layer 21 and a resin layer 22. The mantle layer 21 defines the first surface thereabove. Preferably, the mantle layer 21 is a fiber structure layer. The resin layer 22 is disposed beneath the mantle layer 21. The resin layer 22 is made of aeratable material. More particularly, aeratable material is a material which is not surrounding isolated, corresponding to said non-aeratable foam material. In practical, the resin layer 22 may be made of poly urethane, and be foamed with opened cell structure. In some cases, the resin layer 22 may be made with elastic fiber structure. The mantle layer 21 and the resin layer 22 are both hydrophilic. Therefore, the mantle layer 21 and the resin layer 22 are able to soak water up.

Said opened cell structure and elastic fiber structure are both new material in application. Therefore, the resin layer 22 can soak water up and be dried easily.

The sheaths 3 are firmly disposed on the second surface of the cover cushion 2 respectively. The cover cushion 2 and each of the sheaths 3 define a pouch therebetween. Each of the pouches has an opening 31, 31'. The openings 31, 31' face to each other. More particularly, a direction defined by one of the openings 31 aims at the other one of the openings 31'.

Figure 6:
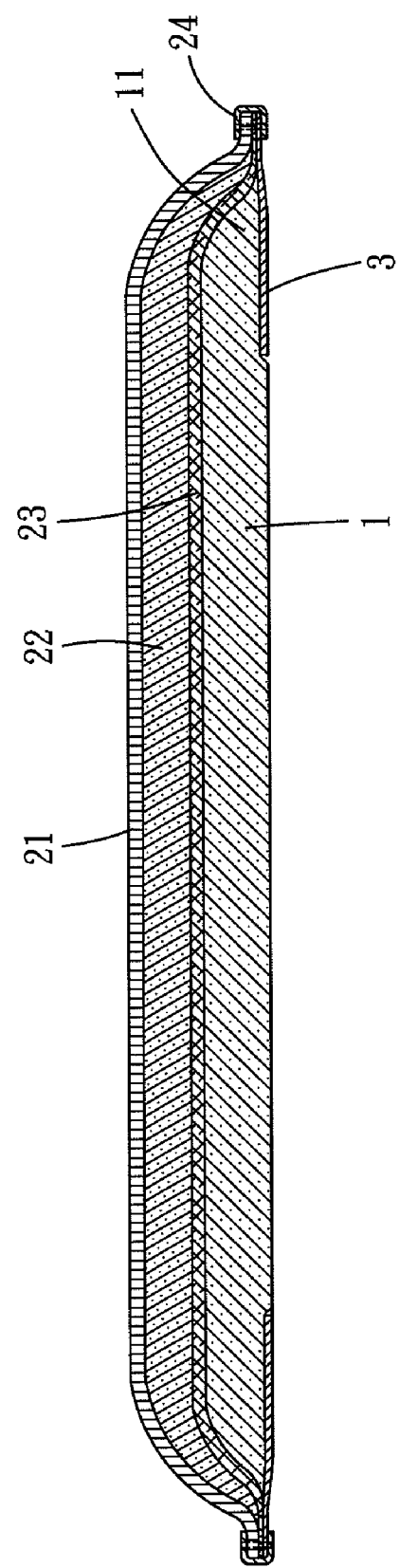
FIG. 6 is a profile showing a third embodiment of the present invention.

In the embodiment above, the sheaths 3, the mantle layer 21 and the resin layer 22 may be combined by sewing. In other possible embodiments of the present invention, a fixation layer 24 may be sewn on the periphery of the cover cushion 2 so as to fix the layers in the cover cushion 2 and the sheaths 3, as shown in FIG. 6.

Accordingly, two sides of the base cushion 1 can be inserted and received in the pouches. Therefore, the base cushion is detachably positioned between the sheaths 3 and the cover cushion 2. The base cushion 1 is clad beneath the cover cushion 2. The base cushion 1 and the cover cushion 2 can be put on the ground together. Also, the base cushion 1 and the cover cushion 2 can be put or assembled on a chair or a bed.

To prevent the cover cushion 2 and the base cushion 1 from sliding, anti-slip mechanism may be disposed on the cover cushion 2 and the sheaths 3. More specifically, the cover cushion 2 may further include an anti-slip layer 23, as shown in FIG. 1. The anti-slip layer 23 is disposed beneath the resin layer 22. The second surface is defined by the anti-slip layer 23. As such, the anti-slip layer 23 is cleaved to the base cushion 1 so as to block the base cushion 1 and the cover cushion 2 from sliding movement. In other embodiments of the present invention, the cover cushion 2 may be composed without the anti-slip layer 23. At the same time, the resin layer 22 defines the second surface. The resin layer 22 is formed with one or several anti-slip structures, such as protrusions, rids or indentations on the second surface. As such, the anti-slip structures are cleaved to the base cushion 1 to resist sliding movement. Moreover, another anti-slip mechanism, such as the anti-slip layer or the anti-slip structure above, may be disposed on the sheaths 3. The anti-slip mechanism is located on the sheaths 3 away from the first surface so as to cleave to the ground. As such, the soft mat of the present invention can not slide freely on the ground.

Figure 7:
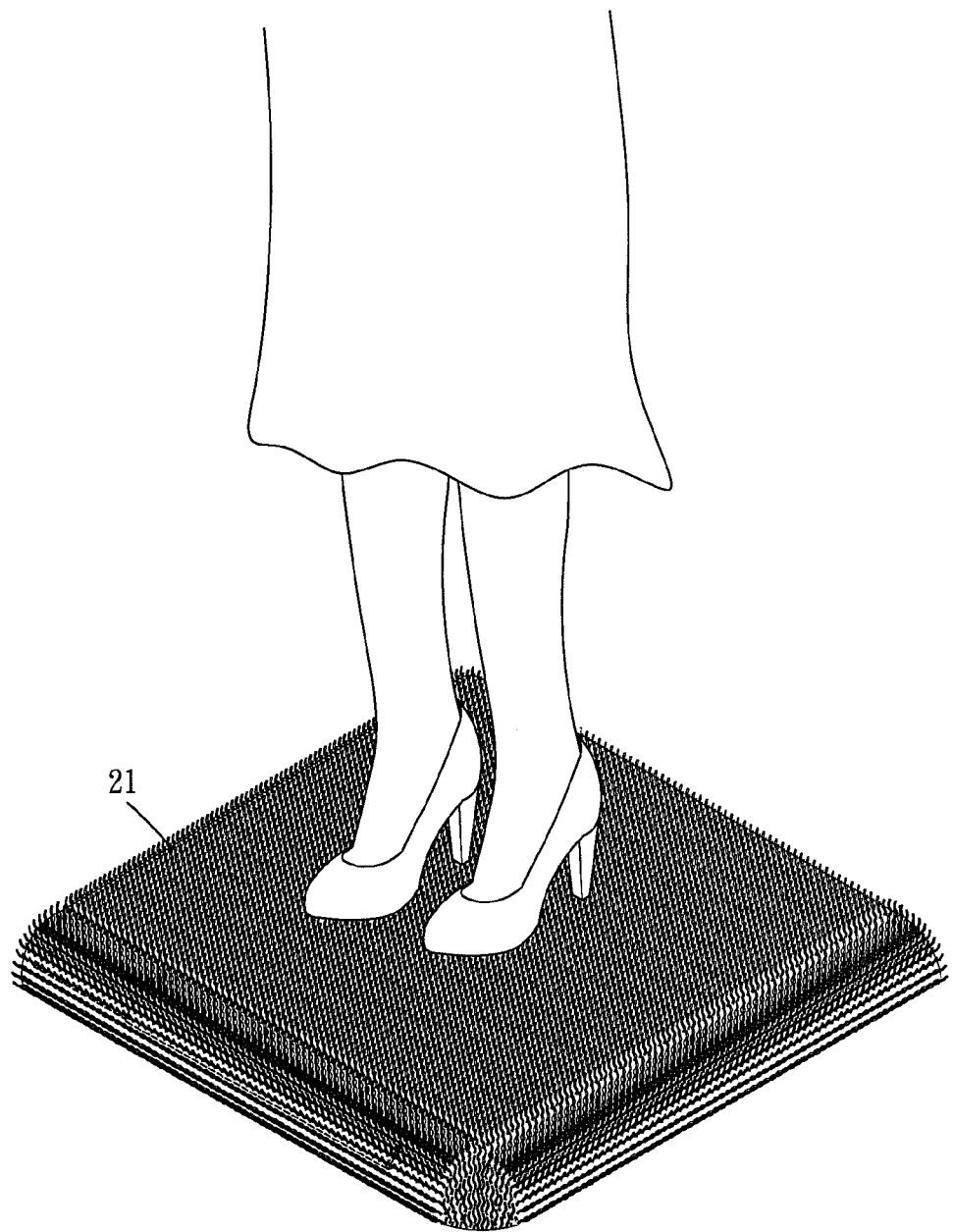
FIG. 7 is a reference chart showing a using state of the present invention.

According to the embodiments above, the base cushion 1 can be clad beneath the cover cushion 2. The base cushion 1 and the cover cushion 2 can be placed on the ground for users to stand, sit or lie thereon, as shown in FIG. 7. All of the base cushion 1, the resin layer 22 and the mantle layer 21 are soft so as to support users' body or feet effectively. The base cushion 1 is non-water-absorbent, so that the efficacy of the soft mat will not be disrupted by water. Discomfort caused by standing for a long period is diminished. Furthermore, the cover cushion 2 is soft, aeratable and water-absorbent. It is comfortable for standing or lying thereon. Moreover, the mantle layer 21 may be performed with a surface having a comfortable feel for touch.

In some cases, the cover cushion 2 and the base cushion 1 may be detached in use. For example, the cover cushion 2 and the base cushion 1 may be used as a yoga mat, bathroom mat or other vade mecum individually.

Moreover, the soft mat of the present invention is easy to be washed and dried. The cover cushion 2 and the base cushion 1 can be washed individually. The base cushion 1 is non-water-absorbent, so that the base cushion 1 can be rinsed with clean water directly. The cover cushion 2 is water-absorbent, so that the cover cushion 2 can be washed and dried. It is noted that the cover cushion 2 includes the mantle layer 21 and the resin layer 22. The structure strength of the resin layer 22 is strengthened by the mantle layer 21. The mantle layer 21 and the resin layer 22 are both hydrophilic, and the cover cushion 2 is totally aeratable. When the cover cushion 2 is soaked with water after being washed, water is physically absorbed by the cover cushion 2. As such, the cover cushion 2 is able to be dehydrated by centrifugation. Therefore, the cover cushion 2 can be dried easily.

To conclude, the soft mat of the present invention provides multiple functions, such as water-absorbing, dust-proofing and body-supporting, and provides a comfortable feel for touch. Further, the soft mat can be cleaned easily. As such, the soft mat can be widely used as a floor mat, a mattress or a seat pad.

What is claimed is:

1. A soft mat, comprising:
   a soft base cushion, the base cushion being non-water-absorbent, the base cushion being made of non-aeratable foam material;
   a soft cover cushion, the cover cushion being water-absorbent, the cover cushion having a first surface and a second surface corresponding to the first surface, the cover cushion comprising a mantle layer and a resin layer, the mantle layer defining the first surface thereabove, the resin layer being disposed beneath the mantle layer, the resin layer being made of aeratable material, the mantle layer and the resin layer being hydrophilic;
   two sheaths, being firmly disposed on the second surface of the cover cushion respectively, the cover cushion and each of the sheaths defining a pouch therebetween, each of the pouches having an opening, the openings facing to each other;
   wherein two sides of the base cushion are inserted and received in the pouches respectively, so that the base cushion is detachably positioned between the sheaths and the cover cushion.

2. The soft mat of claim 1, wherein at least two sides of the base cushion are formed with an insertion area, and a thickness of the insertion area is decreased to a periphery of the base cushion.

3. The soft mat of claim 1, wherein the mantle layer is a fiber structure layer.

4. The soft mat of claim 1, wherein main material of the resin layer is polyurethane.

5. The soft mat of claim 1, wherein the resin layer is a foam material layer which has entirely opened cell structure.

6. The soft mat of claim 1, wherein the resin layer is an elastic fiber structure layer.

7. The soft mat of claim 1, wherein the cover cushion further comprises an anti-slip layer, the anti-slip layer is disposed beneath the resin layer, the anti-slip layer defines the second surface therebeneath.

8. The soft mat of claim 1, wherein a surface of the resin layer is formed with an anti-slip structure.

9. The soft mat of claim 1, wherein each of the sheathes has an anti-slip mechanism, the anti-slip mechanism is located on a surface of the sheath.

10. The soft mat of claim 1, wherein the cover cushion is able to be dehydrated by centrifugation after the cover cushion is soaked with water.

* * * * *